United States Patent [19]

Welzen et al.

[11] Patent Number: 4,902,105

[45] Date of Patent: Feb. 20, 1990

[54] LIQUID CRYSTAL DISPLAY DEVICE

[75] Inventors: Theodorus L. Welzen; Adrianus J. S. M. De Vaan, both of Eindhoven, Netherlands

[73] Assignee: U.S. Philips Corporation, New York, N.Y.

[21] Appl. No.: 180,605

[22] Filed: Apr. 5, 1988

Related U.S. Application Data

[63] Continuation of Ser. No. 772,239, Sep. 3, 1985, abandoned.

[30] Foreign Application Priority Data

Sep. 19, 1984 [NL] Netherlands .................... 8402864

[51] Int. Cl.$^4$ .................... G02F 1/133; G09G 3/34
[52] U.S. Cl. .................... 350/346; 340/784; 350/335
[58] Field of Search ............ 340/784; 350/335, 346, 350/340, 341, 350 R

[56] References Cited

U.S. PATENT DOCUMENTS

| | | | |
|---|---|---|---|
| 4,364,039 | 12/1982 | Penz | 350/335 |
| 4,413,256 | 11/1983 | Yasuda et al. | 340/784 |
| 4,556,286 | 12/1985 | Uchida et al. | 350/335 |
| 4,596,446 | 6/1986 | Waters et al. | 350/346 |
| 4,608,558 | 8/1986 | Amstutz et al. | 340/784 |

OTHER PUBLICATIONS

Alt and Pleshko, "Scanning Limitations of Liquid-Crystal Displays," *IEEE Transactions on Electronic Devices*, vol. ED-21, No. 2, Feb. 1974, pp. 146-155.

*Primary Examiner*—Bruce Y. Arnold
*Assistant Examiner*—Martin Lerner
*Attorney, Agent, or Firm*—John C. Fox

[57] ABSTRACT

A liquid crystal display device which comprises two supporting plates spaced a distance d from each other the which a pattern of line and column electrodes, respectively, is provided on the facing surfaces and form a matrix of display cells. A mixture of a nematic liquid crystal with a cholesteric addition is present between the supporting plates. The mixture has a positive dielectric anisotropy and a natural pitch p such that the ratio d/p has a value between 0.5 and 1. The cell support surfaces comprise an orientation layer which gives the director over the layer thickness d a rotation between $\pi$ and $2\pi$ radians with, the director at one surface enclosing an angle of tilt between 0° and 70° and at the other surface an angle of tilt between 5° and 70°. Data voltages are applied to the column electrodes and line selection pulses are applied to the line electrodes. The line selection voltage, the data voltage and the frame time are chosen to provide a display cell in the stationary "on" condition during the frame time show a transmission which is formed by the superposition of a background level $T_{b1}$ and a peak response with peak height $T_1$, while a display cell in the stationary "off" condition during the frame time shows a transmission which is formed by the superposition of a background level $T_{b2}$ and a peak response having peak height $T_2$, and a display cell which is switched from the stationary "off" condition to the stationary "on" condition to reach the "on" condition via a transmission-response curve which is formed by the superposition of a background level and a peak response having final values $T_{b1}$ and $T_1$, respectively, $T_1$ being larger than or equal to 0.5 $(T_{b1}-T_{b2})$. The display device shows fast switching times with a large multiplex ratio and has a contrast with a small dependence on the viewing angle.

11 Claims, 3 Drawing Sheets

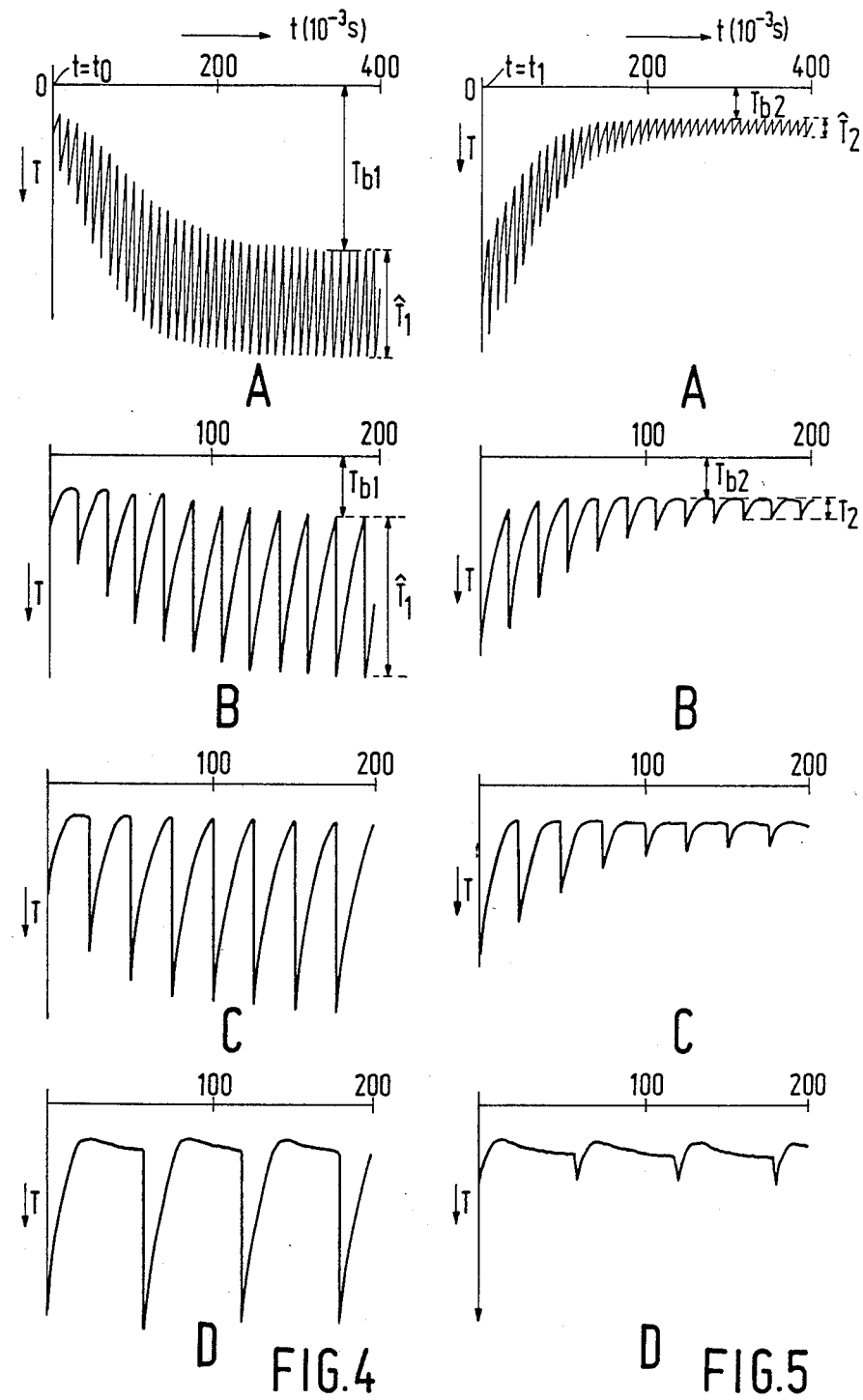

LIQUID CRYSTAL DISPLAY DEVICE

This application is a continuation of previous application Ser. No. 772,239, filed Sept. 3, 1985 now abandoned, and all benefits for such earlier application are hereby claimed for this continuation application.

BACKGROUND OF THE INVENTION

The invention relates to a display device comprising a liquid crystal display with at least one polarizer, which liquid crystal display comprises two parallel supporting plates having facing surfaces spaced a distance d from each other and on one surface of which a pattern of line electrodes is provided and on the other surface of which a pattern of column electrodes is provided, the line electrodes crossing the column electrodes and the crossings forming a matrix of display cells, a layer of a nematic liquid crystal with a cholesteric addition being present between the supporting plates, the liquid crystal having a positive dielectric anisotropy and a natural pitch p.

Such display devices are known and are conventionally operated in multiplex drive with electric voltages according to the so-called r.m.s. mode. The way of driving is described by Alt and Pleshko in IEEE Trans. El. Dev., Vol. ED 21, 1974, pp. 146-155 and is considered the most widely used manner of driving a liquid crystal display devices. The maximum number of lines n which can be driven with an acceptable contrast ratio by means of this method is determined by the relation:

$$n_{max} = \left[ \frac{V_2^2 + V_1^2}{V_2^2 - V_1^2} \right]^2$$

wherein $V_2$ is the required r.m.s. voltage across a display cell to switch it to the "on" condition, and $V_1$ is the r.m.s. voltage at which the display cell is in the "off" condition. Accordingly as $V_2$ and $V_1$ are brought closer together, a larger number of lines n can be driven. Of course this requires a steep threshold in the transmission/voltage characteristic of the display cell. However, as n increases, the time in which the desired contrast ratio is achieved also increases.

A steep threshold, however, does not say anything about the speed of the optical effect which brings a display cell from the "off" condition to the "on" condition (the so-called rise time). This also applies to the speed of the optical effect which brings a display cell from the "on" condition back to the "off" condition (the so-called decay time). As is known in the known liquid crystal display devices operated according to the r.m.s. mode the rise time and decay time of optical effects are considerably larger than the time necessary to write one complete frame (frame time). This leads to long switching times from the "off" condition to the "on" condition of a display cell, and conversely. Therefore such devices are not so suitable for displaying information with great information density rapidly varying in time, for example, as is the case in television and video. A further great disadvantage of the known display devices of the twisted nematic type is that the contrast of the displayed picture depends considerably on the angle at which the image is viewed. As the viewing angle increases the contrast decreases considerably. In this connection it is pointed out that the contrast in itself already is a problem in such display devices having more than 100 lines, i.e. display devices having a multiplexing ratio of more than 1:100.

SUMMARY OF THE INVENTION

It is the object of the invention to provide a liquid crystal display device which permits rapid on and off switching times, a high multiplexing ratio and the contrast of which at large viewing angle variations is maintained at an acceptable level.

According to the invention, a liquid crystal display device of the type mentioned in the opening paragraph is characterized in that: the ratio d/p has a value between 0.5 and 1, the cell supporting surfaces are provided with an orientation layer which gives the average direction of the longitudinal axis of the liquid crystal molecules (director) over the layer thickness d a rotation increasing to a value between $\pi$ and $2\pi$ radians and gives the molecules at one surface an angle of tilt between 0° and 70° and those at the other surface an angle of tilt between 5° and 70° with respect to the respective surfaces; the device further comprises a line scanning circuit for scanning, within a frame time $t_f$, successively and periodically the line electrodes with a line selection pulse and a column selection circuit for supplying data pulses to the column electrodes during a period in which a line electrode is scanned for selecting those display cells which are to be switched from a first condition to a second condition differing optically from the first, with the line selection pulses, the data pulses and the frame time $t_f$ being chosen such that a display cell in the stationery "on" condition during the frame time shows a transmission which is formed by the superposition of a background level $T_{b1}$ and a peak response having a peak height $\hat{T}_1$, a display cell in the stationary "off" condition during the frame time shows a transmission which is formed by the superposition of a background level $T_{b2}$ and a peak response having a peak height $\hat{T}_2$, and a display cell which is switchd from the stationary "off" condition to the stationary "on" condition reaches the "on" condition via a transmission-response curve which is formed by the superposition of a background level and a peak response having final values $T_{b1}$ and $\hat{T}_1$, respectively, with $T_1$ being larger than or equal to 0.5 ($T_{b1} - T_{b2}$).

The invention is based on the recognition of the fact that a suitable choice of parameters such as driving voltages, line time and frame time in combination with the cell configuration results in a display device having comparatively short switching times. It has furthermore been found that the display device according to the invention can be switched with comparatively low driving voltages. A further advantage is that the dependence of the contrast on the viewing angle is less strong than that in display devices based on the twisted nematic effect. All this, and in particular the short switching times, makes a wide field of application of the display device possible, such as alphanumerical and/or video.

An embodiment of a display device according to the invention is characterized in that a display cell which is switched from the stationary "off" condition to the stationary "on" condition shows a transmission response which during the first occurring frame time is equal to that of each of the subsequent frame times. The advantage of this is that rapid information changes can be displayed. Per frame, i.e. per period of time necessary to scan all the line electrodes once, a complete information change can be displayed. A choice of the parameters which inter alia determine the cell configuration and which are particularly suitable with respect to rapid switching times is that in which the ratio d/p is approximately 0.75, the director over the layer thickness d shows a rotation increasing to $3/2\pi$ radians and the layer thickness d is smaller than 8 microns.

A display device according to the invention may be operated in the transmission mode or in the reflection mode. In both cases, the optical properties of the liquid crystal material, for example, birefraction ($\Delta n$) and in particular the rotation of the plane of polarisation are used. In the transmission mode the display device is placed between two linear polarisers and the mutual position of the polarisers determines whether a selected display cell with respect to a non-selected display cell is displayed as a light cell or as a dark cell. In the reflection mode the rear supporting plate of the display device comprises a reflector. The mutual position of the polarisers then determines again whether a selected display cell is displayed as light on a dark background or as dark on a light background. As a result of the birefracting properties of the liquid crystal material the desired colour contrast can be optimized by means of the mutual position of the polarizers, i.e. the mutual angular rotation. With respect to a parallel or orthogonal position of the polarisers, deviations up to 45° of the polariser positions may be necessary for an optimum contrast dependent on the product d.$\Delta n$. With an effect which is partly based on birefraction, contrast is also observed, of course, when one polariser is used in combination with a reflector. In a further embodiment of a display device to be operated in the transmission mode the device is made as a double layer construction. Such a construction is characterized in that it comprises a first liquid crystal display and a second liquid crystal display placed behind the first, the front supporting plate of the first display and the rear supporting plate of the second display comprising a polariser, a common polariser being present between the two displays. Such double layer cells increase the contrast in the displayed picture. The brightness of the picture can be increased by placing a strong light source behind the display device.

A further embodiment of a display device in accordance with the invention is characterized in that the line scanning circuit provides line selection pulses of a voltage $V_l$, the column selection circuit provides data pulses of a voltage $\pm V_c$ and that of the display cells which are connected to an instantaneously scanned line electrode during a line period, selected display cells convey a voltage $V_l+V_c$, non-selected display cells convey a voltage $V_l-V_c$ and all cells not connected to the instantaneously scanned line electrode convey a voltage $\pm V_c$.

A still further embodiment of a display device in accordance with the invention is characterized in that the data pulses are formed as pulses modulated in pulse duration by the picture information. A polarity change of a data pulse within the duration of the line pulse takes place. By shifting the edge of the data pulse the ratio of the time duration over which a cell conveys a voltage $V_l+V_c$ and $V_l-V_c$ can be varied. In this manner "grey scales" in the displayed picture can be realised. Besides the use for alphanumerical display, this latter embodiment in particular provides the possibility of expanding this application to displaying television or video information whether or not in colour.

BRIEF DESCRIPTION OF THE DRAWINGS

The invention will now be described in greater detail, by way of example, with reference to the drawings, in which FIGS. 4A through D show the transmission response curves for various frame times of a display cell when it is switched from the stationary "off" condition to the stationary "on" condition, FIGS. 5A through D show for various frame times in a manner analogous to that shown in FIG. 4, the transmission response curves of a display cell switched from the stationary "on" condition to the stationary "off" condition.

DESCRIPTION OF THE PREFERRED EMBODIMENTS

Figure 1:
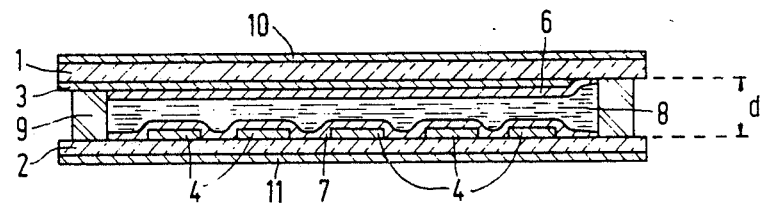
FIG. 1 is a sectional view of a display device according to the invention, FIG. 2 illustates the principle of a possible method of driving a liquid crystal display device.

The display device shown in FIG. 1 comprises two glass supporting plates 1 and 2. The supporting plate 1 comprises a pattern of strip-shaped electrodes 3 consisting of indium-tin oxide. The supporting plate 2 also comprises a pattern of strip-shaped electrodes 4 consisting of indium-tin oxide. The electrodes 3 intersect the electrodes 4 and the crossings constitute the display cells which in this manner are arranged according to a matrix. Over the surfaces of the supporting plates 1 and 2 and the electrodes 3 and 4 a silicon oxide layer is vapour-deposited at an angle of 80°–86° to the normal on the surface. The layers constitute the orientation layers 6 and 7. A liquid crystal 8 marketed under the tradename ZLI 1694 by E. Merck and the cholesteric addition 4-(4-hexyloxybenzoyloxy)-benzoic and acid-d-2-octyl ester marketed by E. Merck under the tradename S 811 is present between the supporting plates. The spacing between the plates is 6.4 microns which is maintained by spacers regularly distributed over the plate surfaces and not shown in the drawing. A sealing edge 9 connects the supporting plates together at their circumference. Sufficient S 811 is added to the nematic liquid crystal so that the pitch p of the helix over which the liquid crystal molecules perform a rotation of 360° is approximately 8.5 microns. The ratio d/p hence is approximately 0.75. The director at the orientation layer 6 is rotated with respect to the director at the layer 7 over an angle $\phi$ equal to $3/2\pi$. As a result of the silicon oxide layers vapour-deposited at an angle, at the plate surfaces the directors are not parallel to the surface but enclose an angle therewith, the so-called angle of tilt $\theta$, of approximately 30°. Although in the present example the twist $\phi$ of the liquid crystal is adapted to the wall conditions imposed by the orientation layers, this is not a necessary condition. In other words the ratio d/p need not be exactly equal to $\phi/2\pi$ but may differ within 10% thereof. The supporting plates 1 and 2 furthermore each comprise a linear polariser, a polariser 10 and an analyser 11. The display cells can be switched from a first condition to a second condition differing optically from the first by driving the electrodes 3 and 4 in a suitable manner. In the case of a parallel position of polariser and analyser a selected display cell will be white (light-transmitting) on a dark background. By rotating one of the polarisers with respect to the other and a suitable choice of the product d.Δn contrasts of deep blue on white to pale yellow on black can arbitrarily be realised.

Figure 2:
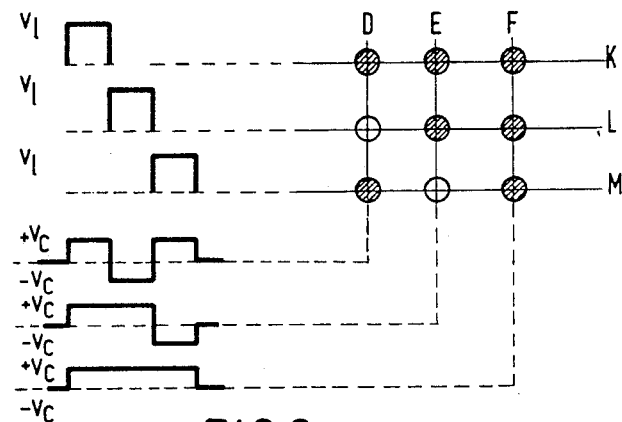

FIG. 2 shows the principle of a possible manner of driving a display device according to the invention. Three line electrodes K, L and M as well as three column electrodes D, E and F are shown. A line selection pulse of the value $V_l$ is successively applied to the line electrodes K, L, M by means of a line scanning circuit (not shown) while voltage pulses of values $\pm V_c$ are applied to all column electrodes by means of a column selection circuit (not shown). Of the display cells which are connected to an instantaneously scanned line electrode, a voltage $V_l+V_c$ is applied to the selected cells and a voltage $V_l-V_c$ is applied to the non-selected cells. The remaining cells remain at the voltage $\pm V_c$. In the figure the non-selected cells are shaded.

Figure 3:
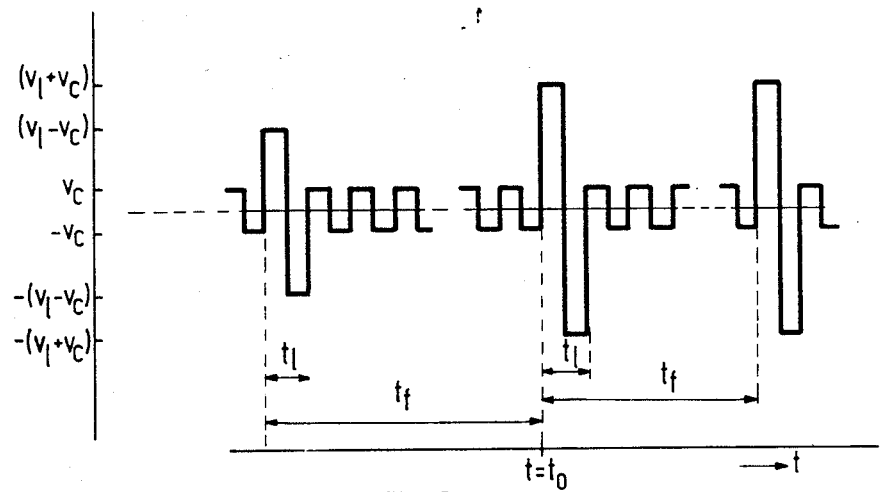
FIG. 3 illustrates the switching from a stationary "off" condition to a stationary "on" condition of a display cell.

FIG. 3 shows how the switching of a display cell from the stationary "off" condition to the stationary "on" condition is reached. A frame period with frame time $t_f$ preceding the instant $t=t_o$ as well as a frame period succeeding the instant $t=t_o$ are plotted on the horizontal time axis t. In the stationary "off" condition of the display cell the voltage variation across the cell per frame is as is shown in the frame preceding the instant $t=t_o$. This means that the cell in the frame time $t_f$ conveys a voltage $|V_l-V_c|$ during the line time $t_l$ and a voltage $|V_c|$ during the time $t_f-t_l$. The stationary "on" condition of a display cell is characterized by a voltage variation per frame period as shown in the frame succeeding the instant $t=t_o$. Therein the cell conveys a voltage $|V_l+V_c|$ during the line time $t_l$ and a voltage $|V_c|$ during the time $t_f-t_l$. At the instant $t=t_o$ the polarity of the data voltage ($V_c$) is switched so that during the subsequent line time $t_l$ and "on" pulse of the voltage $|V_l+V_c|$ is applied to the cell. In other words the cell is switched from the stationary "off" condition to the stationary "on" condition at the instant $t=t_o$. The transmission response which the cell shows when it is switched from the stationary "off" condition to the stationary "on" condition at $t=t_o$ is shown in FIGS. 4A through D. In an analogous manner FIGS. 5A through D shows the transmission response of the cell when it is switched from the stationary "on" condition to the stationary "off" condition at the instant $t=t_l$.

FIGS. 4 and 5 show the transmission response curves for four cases A, B, C and D corresponding to frame times of 10; 17,5; 25 and 60 msec., respectively. In all cases they relate to a liquid crystal display device having 128 line electrodes (multiplex ratio 128) and being of the configuration as shown with reference to the display device shown diagrammatically in FIG. 1. The switching times necessary to bring the cell from one stationary condition to the other can be derived from FIGS. 4 and 5. The following table shows the switching times in msec. which are defined as the time in which 90% of the maximum transmission variation between the stationary "off" and "on" condition is reached.

The table also shows the line selection voltages ($V_l$) and data voltages ($V_c$) in volts chosen with the various frame times.

|   | frame time msec | $V_l$ (V) | $V_c$ (V) | "on" msec | "off" msec |
|---|---|---|---|---|---|
| A | 10 | 19.5 | 1.36 | 130 | 135 |
| B | 17.5 | 17.5 | 1.34 | 100 | 110 |
| C | 25 | 16.5 | 1.39 | 70 | 100 |
| D | 60 | 15.2 | 1.33 | within the frame time | within the frame time |

The variation of the transmission response curve of a display cell will now be described with reference to case A in FIGS. 4A and 5A. Shown is the transmission T as a function of the time t upon switching "on" at $t=t_o$ and switching "off" at $t=t_1$. Before the instant $t=t_o$ the display cell is in the stationary "off" condition (see also FIG. 3). The transmission which the cell shows during a frame time is formed by the superposition of a background level $T_{b2}$ and a peak response having peak height $\hat{T}_2$ (see FIG. 5A). The "on" condition is reached via a transmission response curve which is formed by the superposition of a background level and a peak response with final values $T_{b1}$ and $\hat{T}_1$, respectively. These final values give the transmission which the cell shows during a frame time in the stationary "on" condition. The transmission is hence formed by the superposition of a background level $T_{b1}$ and a peak response with peak height $\hat{T}_1$. The peak height $\hat{T}_1$ is larger than or equal to 0.5 $(T_{b1}-T_{b2})$. The cases B, C and D show in an analogous manner the switching behaviour of a display cell with longer frame times. When the frame time increases, the ratio $\hat{T}_1/(T_{b1}-T_{b2})$ increases.

In case D the transmission response curve which the cell shows during the first frame time occurring after $t=t_o$ is equal to that during each of the subsequent frame times. The frame time of 60 msec., however, is so long that picture flickering occurs because within every 60 msec. the transmission reaches a maximum value and goes back again to a low transmission level. In order to avoid this, approximately 30 msec. (case C) ought to be chosen for the frame time. In that case television display by means of the device according to the invention is possible as such.

The display device in combination with the addressing method described leads to rapid switching times as can be derived from FIGS. 4 and 5.

The embodiment described relates to a liquid crystal mixture of ZLI 1694 and 1.19% S 811. Other non-limiting examples of liquid crystal mixtures which satisfy the object of the invention are mixtures selected from the group consisting of: ZLI 1694 and 1.79% CB 15; ZLI 2293 and 1.69% CB 15; ZLI 2293 and 1.32% S 811; ZLI 2222-100 and 1.75% CB 15; ZLI 1557 and 1.69% CB 15; ZLI 1840 and 1.5% CB 15; and ZLI 1957/5 and 1.76% CB 15. The addition CB 15 is marketed under this trade name by BHD-Chemicals and according to the statement consists of n-cyano-4'-(2-methyl)-isobutyl-biphenyl.

Figure 6:
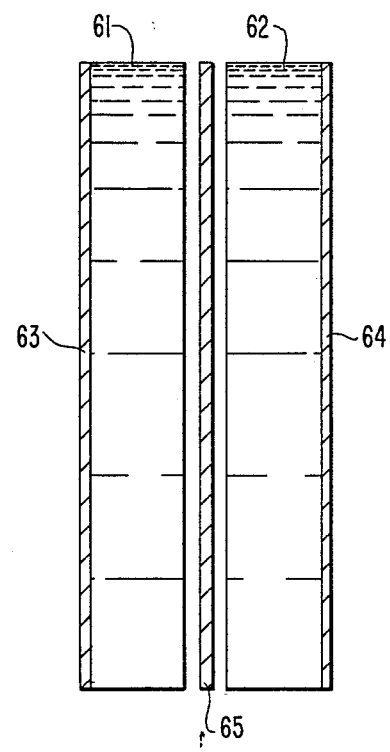
FIG. 6 shows another embodiment of a liquid crystal display device of the invention as a double layer construction.

FIG. 6 shows schematically a side view of another embodiment of a display device of the invention, including a first liquid crystal display 61 having a polarizer 63 on the front surface thereof, a second liquid crystal display 62 having a polarizer 64 on the rear surface thereof, and a common polarizer 65 between the two displays. Such an arrangement increases the contrast of the displayed picture.

What is claimed is:

1. A method of driving a display device having at least one display cell, said method comprising the steps of
   providing at least one liquid crystal display device having a matrix of display cells, said display device having a plurality of line electrodes at one side of said display device and a plurality of column electrodes at an opposite side of said display device.
   periodically applying a line selection pulse of value $V_1$ to a number of said line electrodes,
   applying voltage pulses of value $\pm V_c$ to all said column electrodes, where $V_1$ is greater than $V_c$,
   wherein within said number of line electrodes, selected cells have a voltage $(V_1+V_c)$ applied, and non-selected cells have a voltage $(V_1-V_c)$ applied, and wherein all other cells have a voltage $\pm V_c$,
   switching said selected cells from a first stationary "off" condition to a second stationary "on" condition, said second condition optically differing from said first condition,
   providing at least one display cell in said first condition during a frame time $t_f$, said first condition being formed by superposition of a background level of transmission response of said display cell of $T_{b2}$ and peak response of said transmission response with a peak height $T_2$,
   providing said at least one display cell in said second condition, said second condition being formed by superposition of a background level of said transmission response of $T_{b1}$ and a peak response of said transmission response with a peak height $T_1$, and
   switching from said first condition to said second condition by a transmission response formed by superposition to said background level $T_{b1}$ and peak response with said peak height $T_1$, respectively,
   wherein said peak height $T_1$ is larger than or equal to $0.5 \, (T_{b1}-T_{b2})$.

2. A method according to claim 1, wherein said voltage pulses of value $\pm V_c$ are formed as modulated pulses, said modulated pulses being modulated by a pulse duration of picture information for said liquid crystal display device.

3. A method according to claim 1 or claim 2, wherein said frame time $t_f$ is at most approximately 30 msec.

4. A display device comprising a liquid crystal display having at least one polariser, which liquid crystal display comprises two parallel supporting plates having facing surfaces spaced a distance d from each other and on one surface of which a pattern of line electrodes is provided and on the other surface of which a pattern of column electrodes is provided, the line electrodes crossing the column electrodes and the crossings forming a matrix of display cells, a layer of a nematic liquid crystal with a cholesteric addition being present between the supporting plates, the liquid crystal having a positive dielectric anisotropy and a natural pitch p, in which the ratio d/p has a value between 0.5 and 1, the said surfaces provided with an orientation layer which gives the average direction of the longitudinal axis of the liquid crystal molecules (director) over the layer thickness d a rotation increasing to a value between $\pi$ and $2\pi$ radians and gives the molecules at one surface an angle of tilt between 0° and 70° and those at the other surface an angle of tilt between 5° and 70° with respect to the respective surfaces, the device further comprising a line scanning circuit for scanning, within a frame time $t_f$, periodically the line electrodes with a line selection pulse, and a column selection circuit for applying data pulses to the column electrodes during a time that a line electrode is scanned for selecting those display cells which are to be switched from a first condition to a second condition differing optically from the first, characterized in that the line selection pulses, the data pulses and the frame time $t_f$ are chosen such that: a display cell in the stationary "on" condition shows a transmission which is formed by the superposition of a maximum background level $T_{b1}$ and a maximum response having a peak height $T_1$; a display cell in the stationary "off" condition shows a transmission which is formed by the superposition of a minimum background level $T_{b2}$ and a minimum response having peak height $T_2$, $T_1$ being larger than or equal to $0.5 \, (T_{b1}-T_{b2})$ for a display cell which is switched from the stationary "off" condition to the stationary "on" condition.

5. A display device as claimed in claim 4, characterized in that a display cell which is switched from the stationary "off" condition to the stationary "on" condition shows a transmission response which during the first occuring frame time is equal to that of each of the subsequent frame times.

6. A display device as claimed in claim 4 or 5, characterized in that the ratio d/p is approximately 0.75, the director over the layer thickness d shows a rotation increasing to $3/2\pi$ radians and the layer thickness d is smaller than 8 microns.

7. A display device as claimed in claim 4 or 5, characterized in that the front supporting plate and the rear supporting plate comprise a polariser.

8. A display device as claimed in claim 4 or 5, characterized in that it comprises a first liquid crystal display and a second liquid crystal display placed behind the first, the front supporting plate of the first display and the rear supporting plate of the second display comprising a polariser, a common polariser being present between the two displays.

9. A display device as claimed in claim 7, characterized in that a reflector is provided on the polariser of the rear supporting plate.

10. A display devide as claimed in claim 4, characterized in that the line scanning circuit provides line selection pulses of the voltage $V_1$, the column selection circuit provides data pulses of the voltage $\pm V_c$, and that during line scanning, selected scanned display cells convey a voltage $V_1+V_c$, non-selected scanned display cells convey a voltage $V_1-V_c$ and all the cells not scanned convey a voltage $\pm V_c$.

11. A display device as claimed in claim 4, characterized in that the data pulses are formed as pulses which are modulated in pulse duration by the picture information.

* * * * *